US008839007B2

(12) United States Patent
Rahardjo et al.

(10) Patent No.: US 8,839,007 B2
(45) Date of Patent: Sep. 16, 2014

(54) SHARED NON-VOLATILE STORAGE FOR DIGITAL POWER CONTROL

(75) Inventors: Johan Rahardjo, Austin, TX (US); Abey K. Mathew, Georgetown, TX (US); George G. Richards, III, Round Rock, TX (US); John J. Breen, Harker Heights, TX (US); Timothy M. Lambert, Austin, TX (US)

(73) Assignee: Dell Products LP, Round Rock, TX (US)

( * ) Notice: Subject to any disclaimer, the term of this patent is extended or adjusted under 35 U.S.C. 154(b) by 321 days.

(21) Appl. No.: 13/163,183

(22) Filed: Jun. 17, 2011

(65) Prior Publication Data

US 2012/0324246 A1    Dec. 20, 2012

(51) Int. Cl.
*G06F 1/26* (2006.01)
(52) U.S. Cl.
CPC .......................................... *G06F 1/26* (2013.01)
USPC ............ 713/300; 713/310; 713/320; 713/321; 713/322; 713/323; 713/324; 713/33; 713/340; 711/104; 711/150; 711/153

(58) Field of Classification Search
USPC ................. 713/300, 310, 320–324, 330, 340; 711/104, 150, 153
See application file for complete search history.

(56) References Cited

U.S. PATENT DOCUMENTS

| 4,839,640 | A | 6/1989 | Ozer et al. |
| 6,567,897 | B2 | 5/2003 | Lee et al. |
| 6,725,317 | B1 * | 4/2004 | Bouchier et al. ............... 710/312 |
| 7,380,085 | B2 * | 5/2008 | Matter et al. ................... 711/170 |
| 2010/0070691 | A1 * | 3/2010 | Kwon ............................ 711/103 |
| 2010/0277151 | A1 | 11/2010 | Tsai et al. |

OTHER PUBLICATIONS

Wikipedia, "Bios", printed from Internet May 9, 2011, 6 pgs.

* cited by examiner

*Primary Examiner* — M Elamin
(74) *Attorney, Agent, or Firm* — Egan, Peterman & Enders LLP.

(57) ABSTRACT

Systems and methods may be implemented in a power device subsystem topology to provide an arbitration and communication scheme between a single consolidated non-volatile random access (NVRAM) memory device and multiple discrete digital power controller devices in a manner that provides data protection and the ability to update the full NVRAM content when needed.

27 Claims, 5 Drawing Sheets

SHARED NON-VOLATILE STORAGE FOR DIGITAL POWER CONTROL

FIELD OF THE INVENTION

This invention relates generally to information handling systems and, more particularly, to non-volatile storage for digital power control used with information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Digital power management has been employed with digital power controller devices for information handling systems such as computer servers. Digital power controller devices provide benefits in terms of design, failure analysis, telemetry, efficiency, and debug. In such applications, memory in the form of non-volatile random access memory (NVRAM) is integrated into each digital power controller device to store the firmware, configuration parameter, and persistent/data logging features such as black boxes of sampled data that lead up to a failure. Recently, the number of voltage regulators used in most computer server systems has also been increasing with each successive server generation. For example, one conventional 12G 2 CPU socket mainstream server has a minimum of 27 power devices (voltage regulators), with 12 of the power devices being digitally controlled voltage regulation components and with the balance of the power devices being analog voltage regulation components.

Figure 1:
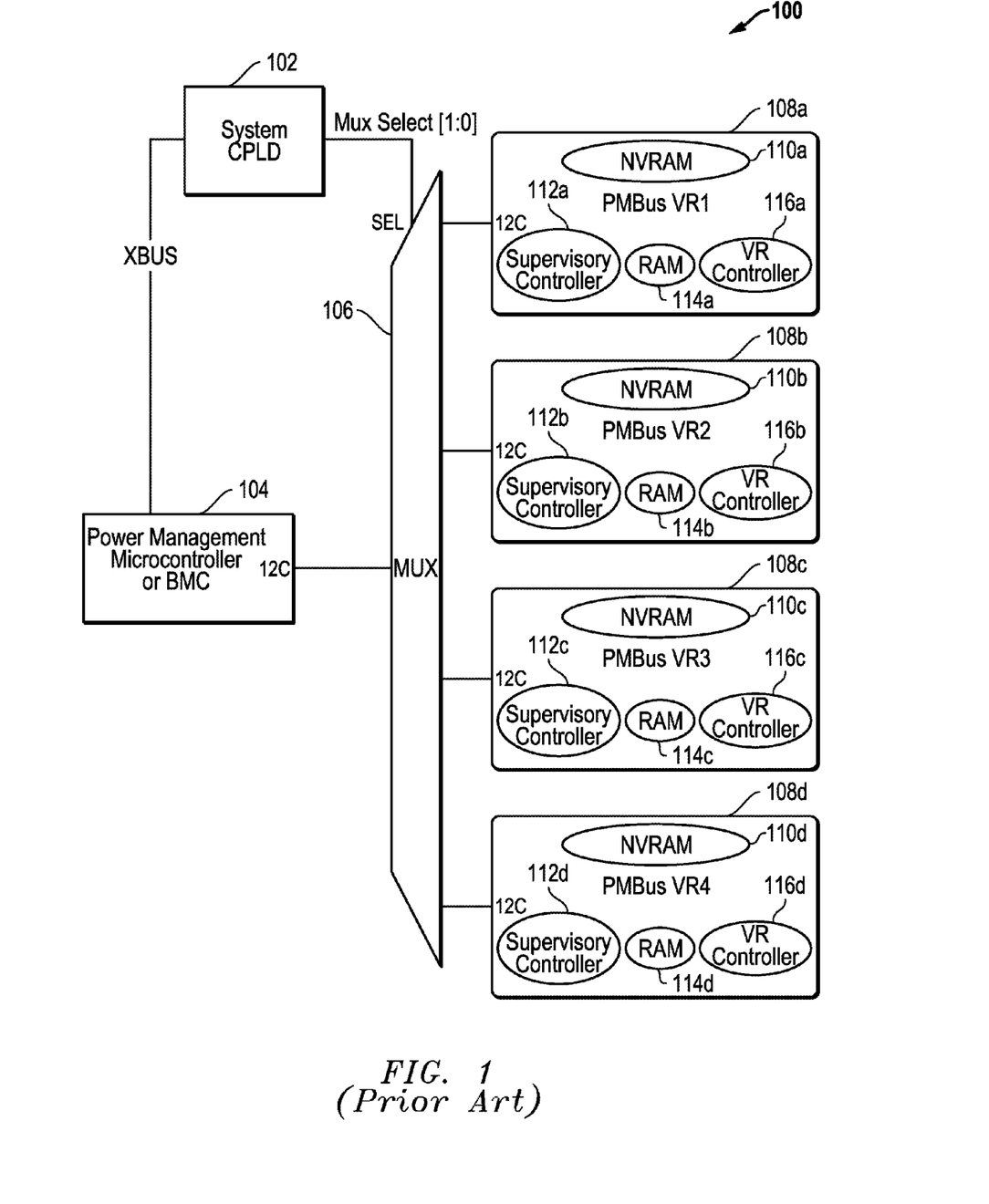
FIG. 1 illustrates a block diagram of a conventional digital power device control architecture.

FIG. 1 illustrates a conventional digital power device control architecture 100 for a computer server according to the prior art. Architecture 100 includes multiple conventional digital power controller devices 108a-108d that each include a respective integrated NVRAM 110, a respective supervisory controller 112, a respective voltage regulator (VR) controller 116, and respective volatile random access memory (RAM) 114. Each digital power device 108 performs voltage regulation control tasks relating to power supplied to and consumed by an individual component of a computer server, such as the system central processing unit (CPU) or a system RAM main memory device. These voltage regulation control tasks include implementing smart power features, performing power monitoring and implementing power control. As further shown in FIG. 1, each digital power controller device 108 is individually coupled as shown to MUX 106 having general purpose input/outputs (GPIOs) that are controlled by a complex programmable logic device (CPLD) 102 using a Mux select signal to selectively couple a power management controller or baseboard management controller (BMC) 104 in communication with one of digital power devices 108 at a time to perform power system tasks such as reading out telemetry from each digital power device 108, updating configuration of firmware on each digital power device 108, or detecting fault data on each digital power device 108.

System BIOS has been implemented by a controller for host machines using serial peripheral interface, central agent, and NVRAM (SPI-Flash). The NVRAM may store multiple option ROM images for several devices. In such a conventional implementation, there is only one central agent (i.e., south-bridge Intel controlled hub/platform controller hub "ICH/PCH") that does the read/write. The devices (PCIe devices, local area network on motherboard "LOM", other input/output "IO" devices, etc.) do not have direct access to the NVRAM, rather only the central agent has access to the NVRAM.

SUMMARY OF THE INVENTION

Disclosed herein are systems and methods that may be implemented in a power device communication topology (e.g., such as a sideband/power device subsystem topology that is separate and different from a host/BIOS subsystem) to provide an arbitration and communication scheme between shared non-volatile random access memory (NVRAM) (e.g., a single consolidated NVRAM memory device such as EPROM, Flash memory, EEPROM, etc.) and multiple discrete power controller devices in a manner that provides data protection and the ability to update the full NVRAM content when needed. The disclosed systems and methods may be implemented in one exemplary embodiment to provide a centralized NVRAM digital voltage regulation scheme for power controller devices of an information handling system (e.g., such as a computer server) by using an arbitration and communication scheme for a common NVRAM that is relatively inexpensive and that saves board real estate compared to distributed NVRAM digital voltage regulation configurations. In this embodiment, each of multiple power controller devices have direct read access so as to read from common shared NVRAM, e.g., without the baseboard management controller (BMC) or other separate component acting therebetween. Due to the reduced cost and space requirements that may be achieved using the consolidated NVRAM digital voltage regulation architecture of this embodiment, digitization of additional digitally controlled voltage regulation components for a given information handling system may be allowed, i.e., as compared to the number of digitally controlled voltage regulation components normally possible for an information handling system that employs a conventional distributed NVRAM voltage regulation configuration.

Using the disclosed systems and methods, multiple power controller devices may arbitrate amongst themselves for ownership of shared NVRAM (e.g., a single common NVRAM device), and each power controller device may access only one or more sections of the shared NVRAM that are designated for that given power controller device. The disclosed systems and methods may also be implemented without a central agent current host (with BIOS SPI-Flash storing multiple option ROM images for several devices), but instead the multiple power controller devices are arbitrating amongst themselves for ownership of the shared NVRAM and accessing only certain sections of the shared NVRAM. In those embodiments where a single common NVRAM device is employed with multiple power controller devices, power system firmware security may be increased over the conventional multi-NVRAM distributed topology since only one NVRAM device is programmable with only one agent (e.g., a BMC) having write access. Moreover the customer image update process may be simplified by providing a consolidated update method for all digital power controllers, rather than using many discrete steps in the manner employed for conventional distributed NVRAM topologies. Additionally, the flexibility for increasing NVRAM space may be realized.

The disclosed systems and methods may be implemented to consolidate and reduce the number of NVRAM devices required for a given number of multiple power controller devices, and also do not require that NVRAM be integrated into each digital power controller device in the conventional manner. The disclosed systems and methods may therefore be implemented to improve and enhance advantages made possible with digital power controller devices by reducing the silicon area required to implement NVRAM with a digital power controller device, thus facilitating the transition from analog interfaces to digital interfaces for information handling system power controller devices such as voltage regulators. Because the cost for implementing individual NVRAM on each digital power controller device in the conventional manner substantially adds to the total system bill of material (e.g., a 50% cost adder to the total silicon cost budget), addition of digital power controller devices with integrated NVRAM in many circumstances outweighs the benefit of migrating most of the remaining power controller devices of an information handling system to a digital interface architecture. In contrast, the disclosed systems and methods may be implemented to provide a cost effective way to configure all or substantially all voltage regulators of an information handling system (such as a computer server) as digital power controller devices.

Thus, a consolidated NVRAM power device subsystem topology may be implemented in one embodiment to provide an information handling system with reduced printed circuit board (PCB) footprint space for various system boards since the total Flash Memory count is reduced. Additionally, better use of the power controller device silicon area may be enabled, e.g. providing the opportunity for bigger RAM on each power device (e.g., allowing better/longer averaging, temporary black-box, etc), or for other control logic. Moreover, lower cost may be provided for each digital power controller device of the system (e.g., to achieve about a 50% cost saving per power controller device), as well as a further cost reduction for a reduced number of NVRAM needed. This translates to lower overall system cost since the NVRAM are shared among the digital power controller devices, while at the same time making practical the proliferation of additional digital controller power devices on a computer server or other information handling system to support smart power management, i.e., facilitating the implementation of digital power controllers at higher adoption rates due to ease of use, lower cost, and reduced board footprints. Additionally, the manufacturing flow logistics and the ICT/PCBA test programming process may be simplified, leading to increased throughput.

In one exemplary embodiment, an information handling system (e.g., such as a computer server) having multiple digital power controller devices may be implemented using a single commodity NVRAM device that is used for all digital power controller devices, thus reducing digital power controller cost. A shared serial peripheral interface (SPI) bus may be provided with multi master support (e.g., including each power controller device and a BMC or power management microcontroller or other suitable processing device) and single slave (e.g., a SPI Flash NVRAM). A pulse width modulated arbitration sequence or pattern may be implemented with a complex programmable logic device (CPLD) that drives a single-wire arbiter signal (i.e., that is duty-cycle based) and that provides direction for time-domain multiplexed SPI Flash owner to each digital power controller device as well as the Baseboard Management Controller. In this exemplary embodiment, each digital power controller device has read-only access to the single SPI Flash NVRAM, and is assigned a corresponding dedicated private address space (or offset) within the SPI Flash NVRAM with the private memory space for a given digital power controller device being determined within the SPI Flash by the address strapping of the corresponding given power controller device. Public address space may also be provided at the top address range (e.g., remaining space in SPI Flash NVRAM) for common storage (e.g., such as for System ID, etc.). As so implemented, increased security may be provided in one embodiment for the power firmware (i.e., having only one programmable NVRAM with only one agent having write access to the NVRAM). Further, the customer image update process may be simplified in one embodiment by providing a consolidated update method for all digital controllers vs. many discrete steps.

In the above described embodiment, the BMC or other suitable main controller of the information handling system may be provided with both read and write access to the SPI Flash NVRAM (SPI Write-Protect control) to modify the power controller device firmware and/or to store or retrieve black-box data (e.g., obtained thru I$^2$C bus). Bus ownership arbitration sequencer logic may be provided to allocate time sequentially to each digital power controller device during the boot process, and then may change the allocation algorithm, e.g. using a remote access controller such as an integrated Dell remote access controller (iDRAC) advance featured system management controller available from Dell Inc. of Round Rock, Tex. which communicates the algorithm change though a packet-switched xBus or other suitable communication infrastructure. Adequate framing may be provided at the beginning and end of addressing each power controller device in order to discern a turnaround and understand the intended addressability before attempting to access the bus.

In one respect, disclosed herein is an information handling system including: multiple power-consuming circuitry components or systems; multiple digitally controlled voltage regulation components coupled to separately regulate power provided to individual power-consuming circuitry components or systems, or to a subgroup of the individual power-consuming circuitry components or systems; multiple digital power controller devices, each of the multiple digital power controller devices being coupled to one or more of the digitally controlled voltage regulation components to separately control the power provided to individual power-consuming circuitry components or systems, or to a subgroup of the individual power-consuming circuitry components or systems; and shared non-volatile memory (NVRAM), each of the multiple digital power controller devices being coupled to access the shared NVRAM by a communication topology configured to provide shared access for the multiple digital power controller devices to the shared NVRAM.

In another respect, disclosed herein is a method for digital power control for an information handling system. The method includes providing an information handling system that itself includes: multiple power-consuming circuitry components or systems, and multiple digitally controlled voltage regulation components coupled to separately regulate power provided to individual power-consuming circuitry components or systems, or to a subgroup of the individual power-consuming circuitry components or systems; providing multiple digital power controller devices, and controlling one or more of the digitally controlled voltage regulation components to separately control the power provided to individual power-consuming circuitry components or systems, or to a subgroup of the individual power-consuming circuitry components or systems; and providing shared non-volatile memory (NVRAM), and providing shared access to the shared NVRAM for each of the multiple digital power controller devices.

In another respect, disclosed herein is a digital power subsystem, including: multiple digital power controller devices, each of the multiple digital power controller devices being configured to be coupled to control multiple digitally controlled voltage regulation components of an information handling system to separately control the power provided to individual power-consuming circuitry components or systems of the information handling system, or to a subgroup of the individual power-consuming circuitry components or systems; and shared non-volatile memory (NVRAM), each of the multiple digital power controller devices being coupled to access the shared NVRAM. The multiple digital power controller devices and the shared non-volatile memory (NVRAM) may be configured to be coupled to one or more processing devices of the information handling system to form a communication topology configured to provide shared access for the multiple digital power controller devices to the shared NVRAM.

DESCRIPTION OF ILLUSTRATIVE EMBODIMENTS

Figure 2:
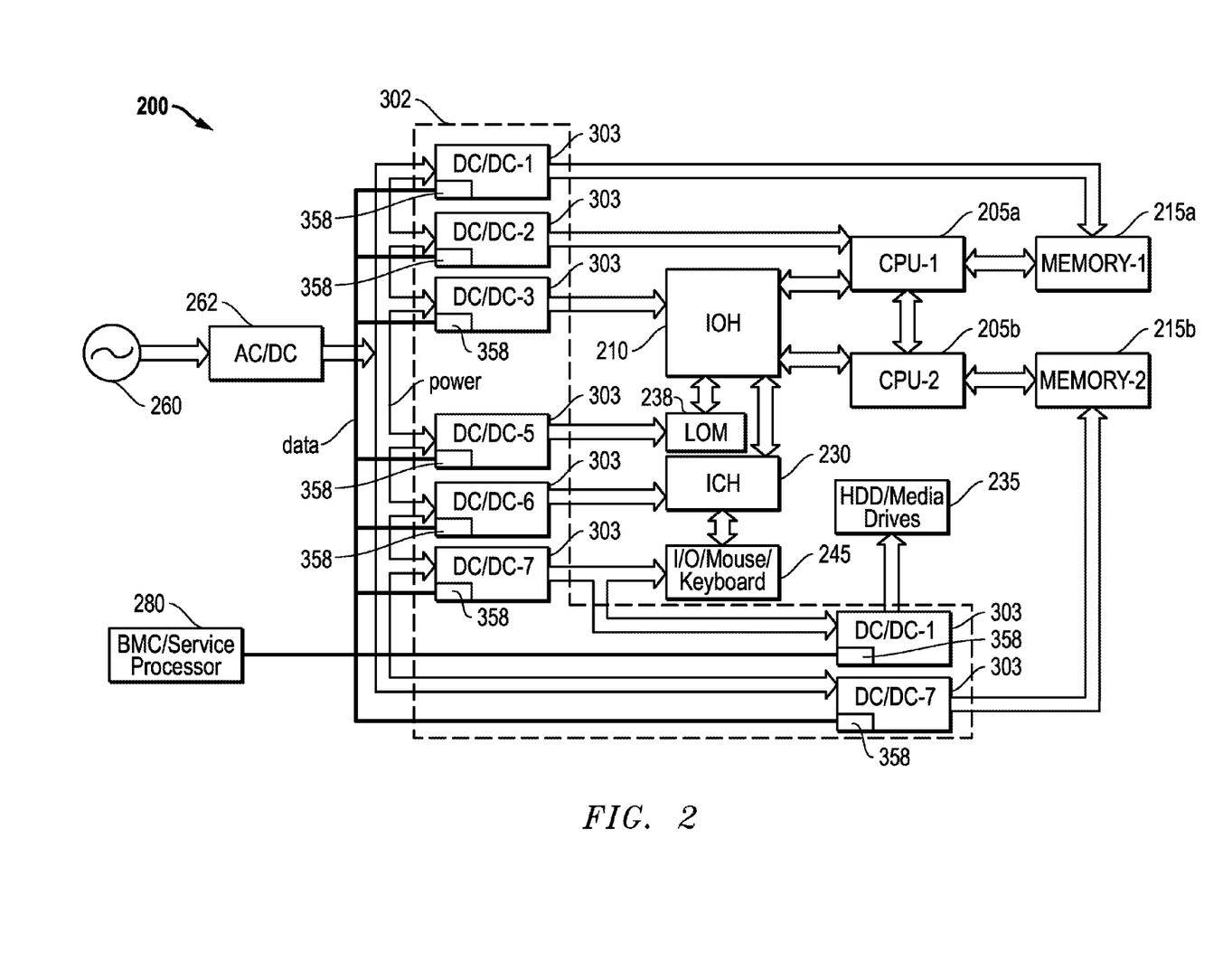
FIG. 2 illustrates a block diagram of an information handling system as it may be configured according to one exemplary embodiment of the disclosed systems.

FIG. 2 is a block diagram of an information handling system 200 as it may be configured as a computer server system according to one exemplary embodiment of the disclosed systems. As shown in FIG. 2, information handling system 200 of this exemplary embodiment includes central processing units (CPUs) 205a and 205b, which may each be an Intel Pentium series processor, an Advanced Micro Devices (AMD) processor or one of many other processors currently available. System memory devices 215a and 215b are coupled as shown to CPUs 205a and 205b, respectively. An input output hub (IOH) 210 is coupled to each processor 205a and 205b, and an Intel controlled hub (ICH) chip 230 is coupled to IOH 210 to facilitate input/output functions for the information handling system. Also coupled to IOH 210 is local area network on motherboard (LOM) 238. Media drives (e.g., hard disk drives or other suitable media drive devices) 235 are coupled to ICH chip 230 to provide permanent storage for the information handling system. Input devices 245 (e.g., keyboard, mouse, touchpad, etc.) are coupled to ICH chip 230 to enable the user to interact with the information handling system. A service processor 280 (e.g., such as baseboard management controller "BMC") running system BIOS is also coupled to ICH chip 230. Service processor 280 may be, for example, running real time OS or embedded Linux and also performing tasks independent of the host and BIOS, such as cooling fan control, etc.

As further shown in FIG. 2, AC/DC power supply unit ("PSU") 262 is provided to receive power from AC mains 260 and in turn provide regulated DC power (e.g., of correct voltage) to various power-consuming circuitry components and systems of information handling system 200 (e.g., such as CPUs 205, main memory devices 215, etc.) through digital power subsystem 302. Digital power subsystem 302 may include any combination of integrated and/or non-integrated voltage regulation circuitry that is suitable for separately regulating power to individual power-consuming circuitry components and systems of information handling system 200 or to sub-grouped portions thereof. As shown in FIG. 2, digital power subsystem may in one embodiment include multiple digitally controlled DC/DC voltage regulation circuitry components 303 that may be controlled as further described herein. Each of Multiple DC/DC voltage regulation circuitries 303 provide particular components of information handling system 200 (i.e., taken together as a system load) with a regulated DC power source as shown. Because power drawn by the various components of information handling system 200 may vary over time, the combined system load and operating conditions of each of DC/DC voltage regulation components 303 may also vary with time. Further information on power distribution architecture may be found in United States Patent Application Publication 20100277151 which is incorporated herein by reference in its entirety.

Still referring to FIG. 2, digital power subsystem 302 is coupled as shown to control the regulation of power for one or more of these power-consuming circuitry components and systems of information handling system 200, and service processor 280 is coupled by a data path as shown to configure and reconfigure the operation of digital power controller device processing components 358 of digital power subsystem 302. In this regard, each of digital power controller devices 358 may or may not be integrated with a respective digitally controlled voltage regulation component 303. It will be understood that the configuration of FIG. 2 is exemplary only, and that an information handling system may be configured with fewer or additional components in addition to digital power subsystem 302 and service processor 280 or other processing device (e.g., controller or processor) suitable for controlling digital power subsystem 302 in a manner as described herein. Moreover, the number and/or configuration of system load components and coupled digitally controlled voltage regulation components 303 may vary.

Figure 3:
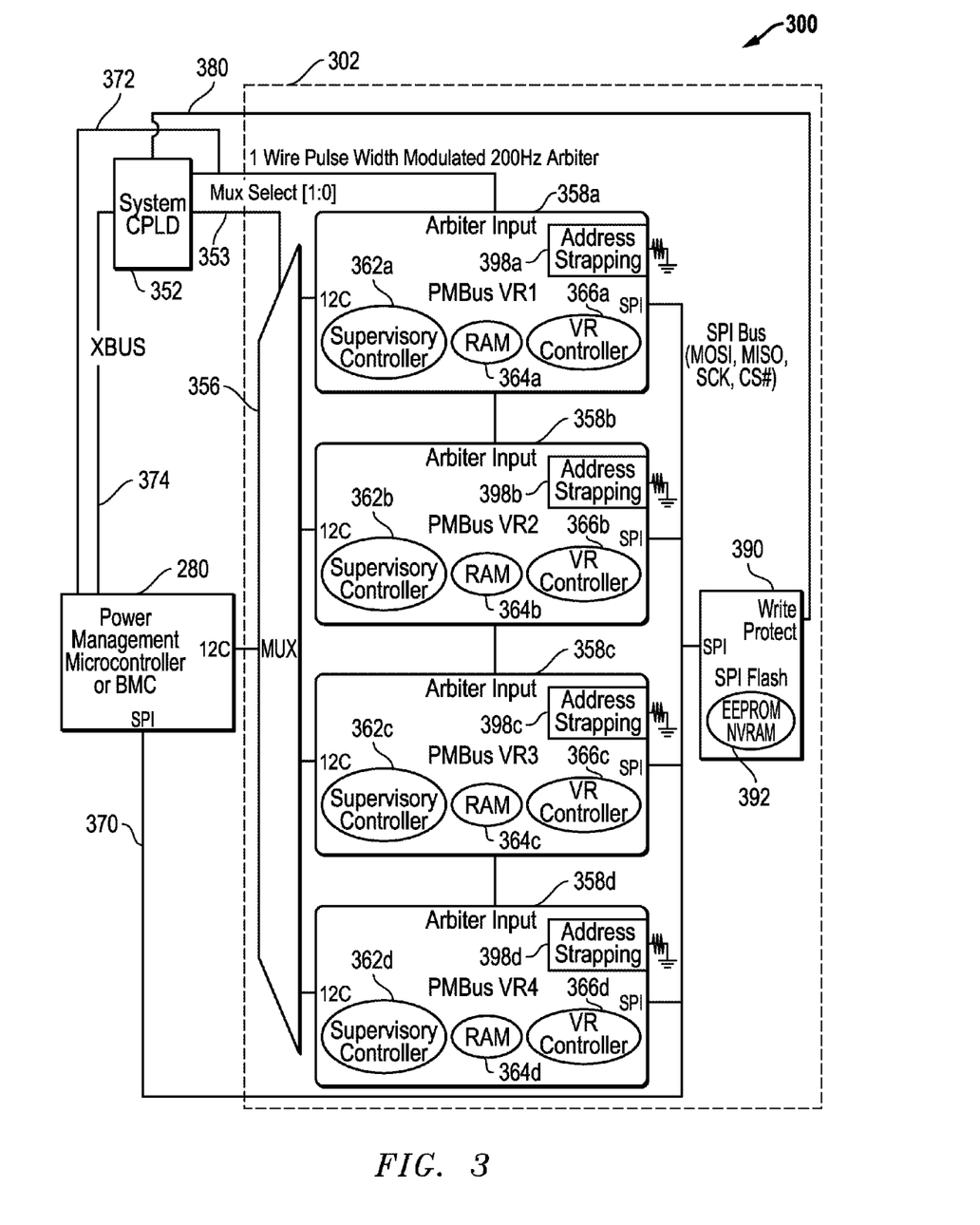
FIG. 3 illustrates a digital power device control architecture according to one exemplary embodiment of the disclosed systems and methods.

FIG. 3 illustrates a digital power device control architecture 300 for a computer server according to one exemplary embodiment of the disclosed systems and methods. As shown, architecture 300 includes digital power subsystem 302 that itself includes multiple digital power controller devices 358a to 358d, although it will be understood that the four illustrated digital power controller devices 358 are exemplary in number and configuration only, and that a digital power subsystem 302 may include any number of two or more multiple digital power controller devices 358 that are configured to operate as part of a digital power device control architecture in a similar manner. Each digital power controller device 358 may be configured to perform one or more voltage regulation tasks to control power supplied by one or more of digitally controlled voltage regulation components 303 to one or more individual power-consuming circuitry components or systems of information handling system 200, e.g., such as CPU 205, main memory 215, as well as one or more other possible components such as an I/O subsystem, a cooling fan subsystem, etc. In this regard, it will be understood that a digital power controller device 358 of architecture 300 may be provided to perform voltage regulation control tasks for any other information handling system component and/or subsystem that consumes regulated power. Examples of possible voltage regulation control tasks that may be performed by a digital power controller device 358 include, but are not limited to, implementing smart power features, performing power monitoring, and implementing power control for the power-consuming circuitry components to which the given digital power controller device 358 is coupled to control provision of power.

Still referring to the exemplary embodiment of FIG. 3, each digital power controller device 358 includes a respective integrated supervisory controller 362, a respective integrated voltage regulator (VR) or Pulse-Width-Modulation (PWM) controller 366, and respective integrated volatile RAM 364. However, each digital power controller device 358 does not include integrated NVRAM in this embodiment. Rather, each digital power controller device 358 is coupled by a SPI bus 370 to a single shared common NVRAM device that is provided in the form of SPI-Flash device 390, which itself includes one or more electrically erasable programmable read only memory (EEPROM) modules 392 as shown. It will be understood that the illustrated embodiment of FIG. 3 is exemplary only, and that other configurations are possible. For example, a digital power device control architecture 300 may include more than one common NVRAM device that are each shared by two or more digital power controller devices 358, and in one embodiment that do not themselves include NVRAM. Moreover, it will be understood that a common NVRAM device may be configured with any suitable type or combination of types of non-volatile memory other than an EEPROM module such as, for example, Flash Memory, EPROM, PROM, MRAM, etc. Furthermore, any given type of one or more communication buses or other suitable communication circuitry path (e.g., any suitable type of shared bus technology such as I2C, SPI, 1-wire, etc.) may be employed to provide access for each of digital power controller devices 358 to shared SPI-Flash device 390.

In the embodiment of FIG. 3, each digital power controller device 358 may be configured to control one or more of digitally controlled voltage regulation components 303 to perform one or more power management tasks relating to power supplied to an individual component or system of information handling system 200, such as the system central processing unit (CPU) 205 and/or system RAM main memory device 215. Examples of power management tasks that may be performed by each digital power controller device 358 include, but are not limited to, implementing smart power features (e.g., such as phase shedding, dynamic frequency adjustment), performing power monitoring (e.g., such as voltage logging, current logging), implementing power control (e.g., such as skip pulse mode, etc.), regulating voltage, etc. Digital power controller device 358 may also be configured to operate as a black box recorder to record operating parameter data (e.g., such as temperature, voltage, frequency, current) in a specified time period immediately prior to a system failure, etc.

As further shown in FIG. 3, each digital power controller device 358 is individually coupled as shown by an I$^2$C bus to MUX 356, which is in turn coupled by an I$^2$C bus to service processor 280, which is configured to perform power management tasks for digital power subsystem 302. The tasks of service processor 280 may be implemented, for example, by a BMC or alternatively another suitable processing device such as a power management microcontroller or any other suitable types or combination of processing devices (e.g., processors, controllers, microcontrollers, ASICs, FPGAs, etc). In this embodiment, MUX 356 has general purpose input/outputs (GPIOs) that are controlled by a complex programmable logic device (CPLD) 352 using a Mux select signal 353 to selectively couple and control communication over the I$^2$C bus between service processor 280 and each one of the individual digital power controller devices 358 at a time. Communication between service processor 280 and each of the individual digital power controller devices 358 may occur at any time and may be used, for example, to perform power management tasks. Such power management tasks include, for example, firmware image management and updating for each of digital power controller devices 358, failure analysis and fault detection for each of digital power controller devices 358, reading out telemetry from each of digital power controller devices 358, etc.

CPLD 352 is also coupled as shown in FIG. 3 as an arbiter that provides a single-wire pulse width modulated (PWM) arbiter signal 372 to each of digital power controller devices 358 and to service processor 280. In such a configuration, CPLD 352 acts as the master arbiter for communication across SPI bus 370 between shared SPI Flash device 390 and service processor 280, as well as between shared SPI Flash device 390 and each of digital power controller devices 358. In this regard, CPLD 352 may send a signal 372 (e.g., 200 Hz signal) to encode the allocated SPI Bus owner for a given time period. For example, CPLD 352 may walk through the address duty cycle for the given power controller devices 358 and service processor 280 in round robin fashion (e.g., device address changes every five clocks during boot time), and may allocate more clock periods for BMC post boot time. It will be understood that the tasks described herein for CPLD 352 may be implemented by any suitable types or combination of processing device/s (e.g., processors, controllers, microcontrollers, ASICs, FPGAs, etc.).

In the architecture of FIG. 3, each given digital power controller device 358 and service processor 280 is assigned a unique address to allow for arbitration between the devices. In this regard, any type of address scheme may be employed that is suitable to allow for arbitrating access to shared SPI Flash device 390 between each of the individual devices 358 and service processor 280. In one exemplary embodiment, each of multiple devices 358 receives the round robin master arbiter PWM signal 372 from CPLD 352, decodes the current duty cycle from the PWM signal 372, and then compares this decoded address with the strapped address 398 of the given digital power controller device 358. Service processor 280 also receives the round robin master arbiter PWM signal 372 and decodes the current duty cycle address from the PWM signal 372 to determine if the decoded address matches the address of the service processor 280.

When the current duty cycle matches the strapped address 398 of a given digital power controller device 358, then this indicates to the given power controller device 358 that it can master the SPI bus 370 during a designated number of clock cycles (e.g., the $2^{nd}$, $3^{rd}$ and $4^{th}$ clock cycles during the boot cycle after a new duty cycle starts) which may be selected as needed or desired to fit a given application. During these designated clock cycles, the given power controller device 358 may read memory space in SPI Flash device 390 in a manner as described elsewhere herein. During the read cycles for digital power controller devices 358, system CPLD 352 asserts a write protect signal 380 to prevent writes from being made to SPI Flash device 390.

When the current duty cycle matches the address of service processor 280, then this indicates to service processor 280 that it can master the SPI bus 370 during the designated number of clock cycles. During these designated clock cycles, CPLD 352 de-asserts write protect signal 380 to give service processor 280 full read and write access to the entire memory space of shared SPI Flash 390, e.g., to modify the configuration files for one or more power controller devices 358, to modify the power controller device firmware image for one or more power controller devices 358, to modify black box recorder data or operating characteristics, to read recorded black box data, etc.

It will be understood that the arbitration sequence of FIG. 3 is exemplary only, and that any other arbitration or other shared access architectures may be employed to provide access for multiple digital power controller devices to a shared NVRAM device. Examples of other types of shared access architectures that may be employed include, but are not limited to, Multi-master I2C arbitration scheme, Master-Slave arbitration, Advance High-speed Bus (AHB) arbitration, etc. Moreover, it will be understood that the tasks described herein for CPLD 352 (including arbiter tasks) may be implemented by any suitable types or combination of processing device/s (e.g., processors, controllers, microcontrollers, ASICs, FPGAs, etc.).

Figure 4:
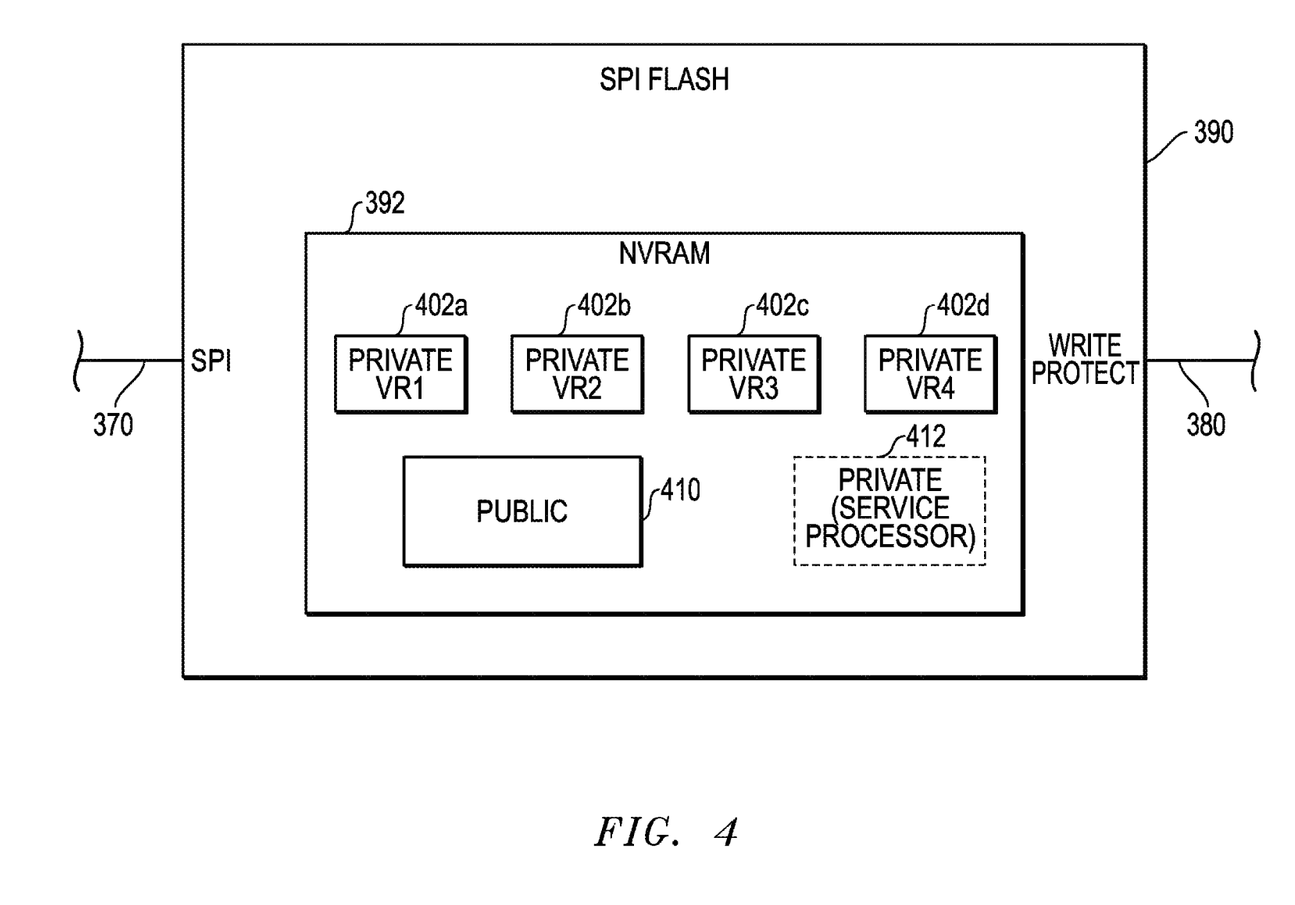
FIG. 4 illustrates partitioning of NVRAM memory space according to one exemplary embodiment of the disclosed systems and methods.

FIG. 4 illustrates exemplary partitioning of EEPROM memory space 392 of shared SPI Flash 390 (e.g., having a total memory size of about 2 MBytes) for the exemplary embodiment of FIG. 3, it being understood that any other type of suitable NVRAM device or combination of NVRAM devices may be similarly partitioned in other embodiments. As shown in FIG. 4, a respective private memory space 402a to 402d (e.g., having 32 KB space of total EEPROM memory space allocated per power controller device) is provided for each of digital power controller devices 358a to 358d, respectively. Each private memory space 402 is for storing voltage regulation parameter information specific to a corresponding given one of the digital power controller devices 358 (e.g., such as voltage out (Vout), Static Initial Frequency, maximum current (Imax), etc. that is specific to the respective given one of the digital power controller devices 358), and that may only be read by its corresponding given digital power processing device 358. Also shown present is public memory space 410 (e.g., having 500 Kbytes allocated space of total EEPROM memory space) for storing general system information, e.g., such as system identifier (ID), platform ID, original equipment manufacturer (OEM) ID, temperature profile, global settings, etc.

Public memory space 410 is read-only accessible by all digital power controller devices 398. An additional private memory space 412 (e.g., having 500 Kbytes allocated space of total EEPROM memory space) only accessible by the service processor 280 may be optionally provided for service processor 280 for purposes of storing such historical system operating parameter information, e.g., such as total system power history, system total power watermark or maximum historical system power level, system temperature history, etc. While each of digital power controller devices 398 has read-only access (via assertion of write protect 380 by CPLD 352) to any portion of memory space 392, service processor 280 has both read and write access (via de-assertion of write protect 380 by CPLD 352) for all of memory space 392.

Figure 5:
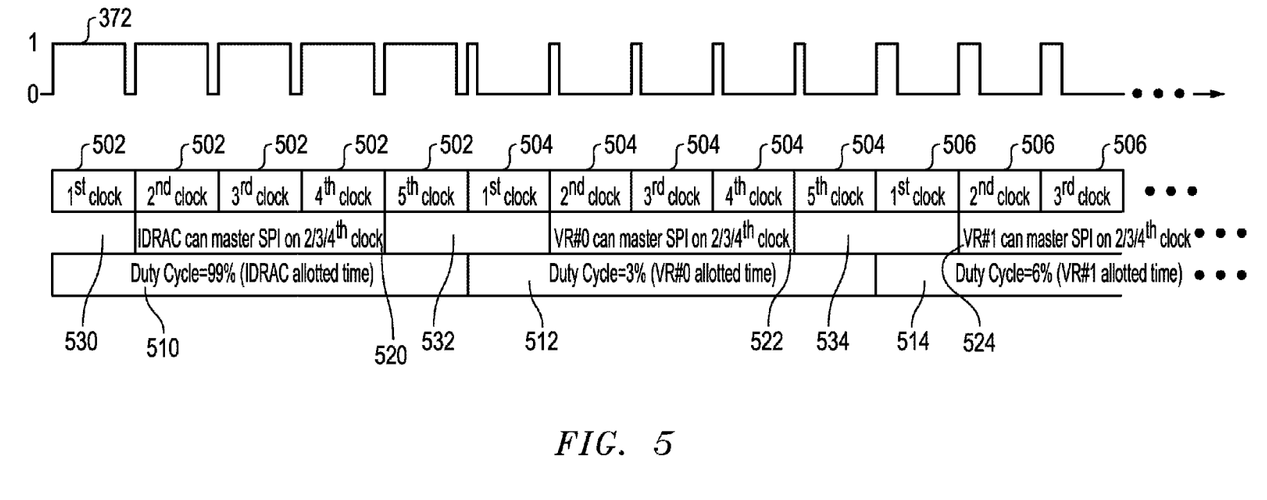
FIG. 5 illustrates a pulse width arbitration sequence according to one exemplary embodiment of the disclosed systems and methods.

FIG. 5 illustrates one exemplary embodiment of a pulse width arbitration sequence that may be employed during power up or boot up of information handling system 200 to arbitrate shared access by service processor 280 and digital power controller devices 358a to 358d, or for a digital power device control architecture 300 having any other greater or lesser number of digital power controller devices 358. In particular, FIG. 5 illustrates the single-wire 200 Hz PWM arbiter signal 372 discussed above in relation to FIG. 3, e.g., as may be driven by CPLD 352 or using any other suitable technique and hardware. In this exemplary embodiment, PWM arbiter signal 372 is driven between high and low at a clock cycle of 200 Hz with a high duty cycle (i.e., fraction of time during a given PWM clock cycle that signal 372 is high) that corresponds to an address of one of power controller devices 358 or service processor 280 in round robin fashion between the various devices.

In this example, five clock cycles 502 are driven to a 99% high duty cycle that indicates the allotted time 510 on SPI bus 370 for service processor (iDRAC) 280. Within this allotted time 510, a three clock cycle addressing time 520 is provided during which service processor 280 may continuously master SPI bus 370 to address and access one or more memory spaces of SPI Flash 390 in a manner as previously described. In one exemplary embodiment, SPI bus 370 may be much faster (e.g., operating at 48 MHz) than the frequency of the arbiter clock cycle (e.g., operating at 200 Hz), thus providing many SPI bus clock cycles (e.g., 240,000 SPI bus clock cycles) for every 200 Hz arbiter clock cycle to allow 30 Kb data transfer for each arbiter pulse. Optional framing periods 530 and 532 may be provided as shown at the beginning and end of addressing time 520 (e.g., $1^{st}$ and $5^{th}$ clock cycles) during which no device is allowed to master SPI bus 370 in order to allow service processor 280 time to discern a turn-around and understand the intended addressability before attempting to access the SPI bus 370. It will be understood that the illustrated scheme of FIG. 5 is exemplary only, and that the number of PWM clock cycles allotted for a given device on SPI bus 370 may vary (i.e., be greater or less than five cycles), and that the number of framing periods before or after a given device addressing time may also vary in number (i.e., be greater or less than two).

A similar pattern is repeated in round robin fashion for each of digital power controller devices 358a to 358d as shown, i.e., five clock cycles 504 are driven to a 3% high duty cycle that indicates the allotted time 512 on SPI bus 370 for digital power controller device 358a, with a three clock cycle addressing time 522 provided during which digital power controller device 358a may master SPI bus 370 to address and access memory space of SPI Flash 390 in a manner as previously described. Framing periods 532 and 534 are provided as shown at the beginning and end of addressing time 522 for the same purpose as previously described. This round robin arbitration sequence is repeated with five clock cycles 506 driven to a 6% high duty cycle that indicates the allotted time 514 on SPI bus 370 for digital power controller device 358b, with a three clock cycle addressing time 524 provided during which digital power controller device 358b may master SPI bus 370 to address and access memory space of SPI Flash 390 in a manner as previously described. The round robin arbitration sequence continues until all devices 280 and 398 have been allotted a time to address SPI Flash 390, after which the pattern repeats, starting again with service processor 280.

It will be understood that the arbitration sequence of FIG. 5 may be established and/or changed in real time, e.g., by service processor 280 communicating the change command in real time to CPLD 352 across parallel bus interface 374 (e.g., LPC47N267 100 Pin Super I/O with X-bus interface available from SMSC of Hauppauge, N.Y.) or other suitable high speed bus. For example, the round robin sequential arbitration sequence of FIG. 5 may be followed during system power up, but then be changed to a different (e.g., non-sequential or different order) arbitration sequence after all digital power controller devices 358a to 358d are powered up to provide service processor 280 with more allotted time on SPI bus 370 to access SPI Flash 390. Service processor 280 may communicate change commands to CPLD 352 at any other time to alter the arbitration sequence as desired in real time across XBUS 374, e.g., to instruct CPLD 352 as to how many PWM time slots or cycles for SPI bus 370 are allocated to each of digital power controller devices 358. In this regard, it is not required that each digital power controller device 358 be allocated the same number of PWM cycles on SPI bus 370 as each other of digital power controller devices 358. Service processor 280 may also take full ownership of NVRAM on SPI Flash 390 at any time by communicating change commands to CPLD 352 across XBUS 374.

Table 1 below shows an example PWM duty cycle address assignment look up table as it may be implemented with an arbitration sequence to provide access to shared NVRAM for 32 different digital power controller devices 358 (i.e., VR#0 to VR#31) and a service processor (BMC) 280. As shown, corresponding duty cycle values of 3% to 99% may be assigned to each respective device as shown. Private space offset within the NVRAM (e.g., SPI Flash EEPROM space 392) may be correlated to the individual address strapping resistors for each digital processing device as shown. Each such private space area may only be accessed by its corresponding power controller device 358 or service processor 280 during the allotted time for that device. Also shown is 180000h-1FFFFFh offset that may be reserved for a public area shared for all devices, e.g., for system ID. This public area may be accessed by any device 358 or 280 during the allotted time for that device.

TABLE 1

| Arbiter Duty Cycle | Device ID | Power Device Address | Address Strapping Resistor (kOhm) | Offset Within SPI Flash (32 KB allocated as private space for each device) |
|---|---|---|---|---|
| 3% | VR#0 | 0x00 | 10 | 000000h-007FFFh |
| 6% | VR#1 | 0x01 | 12 | 008000h-00FFFFh |
| 9% | VR#2 | 0x02 | 14 | 010000h-017FFFh |
| 12% | VR#3 | 0x03 | 17 | 018000h-01FFFFh |
| 15% | VR#4 | 0x04 | 21 | 020000h-027FFFh |
| 18% | VR#5 | 0x05 | 25 | 028000h-02FFFFh |
| 21% | VR#6 | 0x06 | 30 | 030000h-037FFFh |
| 24% | VR#7 | 0x07 | 36 | 038000h-03FFFFh |
| 27% | VR#8 | 0x08 | 43 | 040000h-047FFFh |
| 30% | VR#9 | 0x09 | 52 | 048000h-04FFFFh |
| 33% | VR#10 | 0x0A | 62 | 050000h-057FFFh |
| 36% | VR#11 | 0x0B | 74 | 058000h-05FFFFh |
| 39% | VR#12 | 0x0C | 89 | 060000h-067FFFh |
| 42% | VR#13 | 0x0D | 107 | 068000h-06FFFFh |
| 45% | VR#14 | 0x0E | 128 | 070000h-077FFFh |
| 48% | VR#15 | 0x0F | 154 | 078000h-07FFFFh |
| 51% | VR#16 | 0x10 | 185 | 080000h-087FFFh |
| 54% | VR#17 | 0x11 | 222 | 088000h-08FFFFh |
| 57% | VR#18 | 0x12 | 266 | 090000h-097FFFh |
| 60% | VR#19 | 0x13 | 319 | 098000h-09FFFFh |
| 63% | VR#20 | 0x14 | 383 | 0A0000h-0A7FFFh |
| 66% | VR#21 | 0x15 | 460 | 0A8000h-0AFFFFh |
| 69% | VR#22 | 0x16 | 552 | 080000h-0B7FFFh |
| 72% | VR#23 | 0x17 | 662 | 0B8000h-0BFFFFh |
| 75% | VR#24 | 0x18 | 795 | 0C0000h-0C7FFFh |
| 78% | VR#25 | 0x19 | 954 | 0C8000h-0CFFFFh |
| 81% | VR#26 | 0x1A | 1145 | 0D0000h-0D7FFFh |
| 84% | VR#27 | 0x1B | 1374 | 0D8000h-0DFFFFh |
| 87% | VR#28 | 0x1C | 1648 | 0E0000h-0E7FFFh |
| 90% | VR#29 | 0x1D | 1978 | 0E8000h-0EFFFFh |
| 93% | VR#30 | 0x1E | 2374 | 0F0000h-0F7FFFh |
| 96% | VR#31 | 0x1F | 2849 | 0F8000h-0FFFFFh |
| 99% | BMC | BMC | n/a | 100000h-17FFFFh |
| n/a | Shared Public space | n/a | n/a | 180000h-1FFFFFh |

It will be understood that one or more of the tasks, functions, or methodologies described herein (e.g., for service processor 280, CPLD 352 and/or power controller devices 358) may be implemented, for example, as firmware or other computer program of instructions embodied in a non-transitory tangible computer readable medium that is executed by a CPU, controller, microcontroller, processor, microprocessor, FPGA, ASIC, or other suitable processing device.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system comprising:
multiple power-consuming circuitry components or systems;
multiple digitally controlled voltage regulation components coupled to separately regulate power provided to individual power-consuming circuitry components or systems, or to a subgroup of the individual power-consuming circuitry components or systems;

multiple digital power controller devices, each of the multiple digital power controller devices being coupled to one or more of the digitally controlled voltage regulation components to separately control the power provided to individual power-consuming circuitry components or systems, or to a subgroup of the individual power-consuming circuitry components or systems; and shared non-volatile memory (NVRAM), each of the multiple digital power controller devices being coupled to access the shared NVRAM by a communication topology configured to provide shared access for the multiple digital power controller devices to the shared NVRAM;

where the communication topology comprises at least one shared bus coupled between the shared NVRAM and each of the digital power controller devices; and where the information handling system further comprises at least one processing device configured as an arbiter device to arbitrate between the multiple digital power controller devices to allow sole access across the shared bus to the shared NVRAM by only one of the multiple digital power controller devices at any given time; and where the information handling system further comprises a service processor communicatively coupled to the arbiter processing device and to each of the multiple digital power controller devices, the service processor being configured to change an arbitration pattern used by the arbiter device to arbitrate between the multiple digital power controller devices to allow sole access to the shared NVRAM by only one of the multiple digital power controller devices at any given time.

2. An information handling system comprising:

multiple power-consuming circuitry components or systems;

multiple digitally controlled voltage regulation components coupled to separately regulate power provided to individual power-consuming circuitry components or systems, or to a subgroup of the individual power-consuming circuitry components or systems;

multiple digital power controller devices, each of the multiple digital power controller devices being coupled to one or more of the digitally controlled voltage regulation components to separately control the power provided to individual power-consuming circuitry components or systems, or to a subgroup of the individual power-consuming circuitry components or systems; and shared non-volatile memory (NVRAM), each of the multiple digital power controller devices being coupled to access the shared NVRAM by a communication topology configured to provide shared access for the multiple digital power controller devices to the shared NVRAM;

where each of the multiple digital power controller devices has an assigned address; where the communication topology is configured to provide shared access for the multiple digital power controller devices to the shared NVRAM by:

using a PWM master arbiter signal to broadcast to all of the multiple digital power controller devices a duty cycle-encoded address of a selected first one of the multiple digital power controller devices that is to be given sole access to the shared NVRAM during a current time period, and subsequently using the PWM master arbiter signal to broadcast to all of the multiple digital power controller devices a duty cycle-encoded address of a selected second one of the multiple digital power controller devices that is to be given sole access to the shared NVRAM during a new current time period, the selected second one of the multiple digital power controller devices being different than the selected first one of the multiple digital power controller devices, and where each given one of the multiple digital power controller devices is configured to decode the duty cycle address from the PWM signal and to access the shared NVRAM when the decoded address matches the assigned address of the given one of the multiple digital power controller devices.

3. The information handling system of claim 2, where a public memory space is allocated in the shared NVRAM; the same public memory space being accessible by all of the digital power controllers.

4. The information handling system of claim 2, where the communication topology is configured to provide arbitration between the multiple digital power controller devices for access to the shared NVRAM.

5. The information handling system of claim 2, where the communication topology comprises at least one shared bus coupled between the shared NVRAM and each of the digital power controller devices; and where the information handling system further comprises at least one processing device configured as an arbiter device to arbitrate between the multiple digital power controller devices to allow sole access across the shared bus to the shared NVRAM by only one of the multiple digital power controller devices at any given time.

6. The information handling system of claim 2, where the communication topology is configured to provide shared access for the multiple digital power controller devices to the shared NVRAM by using the PWM master arbiter signal to sequentially broadcast to all of the multiple digital power controller devices the duty cycle-encoded addresses of each of the multiple digital power controller devices in round robin fashion.

7. The information handling system of claim 2, where the shared NVRAM comprises a single shared NVRAM device.

8. The information handling system of claim 2, where a separate private memory space corresponding to each given one of the digital power controllers is allocated in the shared NVRAM, the private space storing voltage regulation parameter information specific to the respective given digital power controller and being only accessible by the given one of the digital power controllers and not being accessible any other of the digital power controllers.

9. The information handling system of claim 2, where each of the digital power controller devices has read-only access to any portion of the shared NVRAM.

10. The information handling system of claim 5, where the arbiter device is a different processing device from all of the digital power controller devices.

11. The information handling system of claim 10, where the arbiter device is a complex programmable logic device (CPLD).

12. An information handling system comprising:

multiple power-consuming circuitry components or systems;

multiple digitally controlled voltage regulation components coupled to separately regulate power provided to individual power-consuming circuitry components or systems, or to a subgroup of the individual power-consuming circuitry components or systems;

multiple digital power controller devices, each of the multiple digital power controller devices being coupled to one or more of the digitally controlled voltage regulation components to separately control the power provided to individual power-consuming circuitry components or systems, or to a subgroup of the individual power-consuming circuitry components or systems; and shared non-volatile memory (NVRAM), each of the multiple digital power controller devices being coupled to access the shared NVRAM by a communication topology configured to provide shared access for the multiple digital power controller devices to the shared NVRAM;

where a separate private memory space corresponding to each given one of the digital power controllers is allocated in the shared NVRAM, the private space storing voltage regulation parameter information specific to the respective given digital power controller and being only accessible by the given one of the digital power controllers and not being accessible any other of the digital power controllers; and where the information handling system further comprises a service processor communicatively coupled to the arbiter processing device and to each of the multiple digital power controller devices; and where separate the separate private memory space corresponding to each given one of the digital power controllers is always accessible by the service processor.

13. The information handling system of claim 12, where a public memory space is allocated in the shared NVRAM; the public memory space being accessible by all of the digital power controllers and storing general system information.

14. The information handling system of claim 13, where a separate private memory space corresponding to the service processor is allocated in the shared NVRAM, the private space corresponding to the service processor storing historical system operating parameter information and being only accessible by the service processor.

15. The information handling system of claim 12, where the system is configured as a computer server.

16. A method for digital power control for an information handling system, comprising:

providing an information handling system that includes: multiple power-consuming circuitry components or systems, and multiple digitally controlled voltage regulation components coupled to separately regulate power provided to individual power-consuming circuitry components or systems, or to a subgroup of the individual power-consuming circuitry components or systems;

providing multiple digital power controller devices, and controlling one or more of the digitally controlled voltage regulation components to separately control the power provided to individual power-consuming circuitry components or systems, or to a subgroup of the individual power-consuming circuitry components or systems;

providing shared non-volatile memory (NVRAM), and providing shared access to the shared NVRAM for each of the multiple digital power controller devices;

providing at least one shared bus coupled between the shared NVRAM and each of the digital power controller devices; and arbitrating between the multiple digital power controller devices to allow sole access across the shared bus to the shared NVRAM by only one of the multiple digital power controller devices at any given time; and providing an arbiter device to arbitrate between the multiple digital power controller devices to allow sole access across the shared bus to the shared NVRAM by only one of the multiple digital power controller devices at any given time; providing a service processor communicatively coupled to the arbiter processing device and to each of the multiple digital power controller devices; and using the service processor to change an arbitration pattern used by the arbiter device to arbitrate between the multiple digital power controller devices to allow sole access to the shared NVRAM by only one of the multiple digital power controller devices at any given time.

17. A method for digital power control for an information handling system, comprising:

providing an information handling system that includes: multiple power-consuming circuitry components or systems, and multiple digitally controlled voltage regulation components coupled to separately regulate power provided to individual power-consuming circuitry components or systems, or to a subgroup of the individual power-consuming circuitry components or systems;

providing multiple digital power controller devices, and controlling one or more of the digitally controlled voltage regulation components to separately control the power provided to individual power-consuming circuitry components or systems, or to a subgroup of the individual power-consuming circuitry components or systems; and providing shared non-volatile memory (NVRAM), and providing shared access to the shared NVRAM for each of the multiple digital power controller devices;

where each of the multiple digital power controller devices has an assigned address; and where the method further comprises providing shared access for the multiple digital power controller devices to the shared NVRAM by:

using a PWM master arbiter signal to broadcast to all of the multiple digital power controller devices a duty cycle-encoded address of a selected first one of the multiple digital power controller devices that is to be given sole access to the shared NVRAM during a current time period, and subsequently using the PWM master arbiter signal to broadcast to all of the multiple digital power controller devices a duty cycle-encoded address of a selected second one of the multiple digital power controller devices that is to be given sole access to the shared NVRAM during a new current time period, the selected second one of the multiple digital power controller devices being different than the selected first one of the multiple digital power controller devices, and where each given one of the multiple digital power controller devices is configured to decode the duty cycle address from the PWM signal and to access the shared NVRAM when the decoded address matches the assigned address of the given one of the multiple digital power controller devices.

18. The method of claim 17, further comprising providing a public memory space that is allocated in the shared NVRAM; and providing all of the digital power controllers with access to the same public memory space allocated in the shared NVRAM.

19. The method of claim 17, further comprising providing arbitration between the multiple digital power controller devices for access to the shared NVRAM.

20. The method of claim 17, further comprising providing at least one shared bus coupled between the shared NVRAM and each of the digital power controller devices; and arbitrating between the multiple digital power controller devices to allow sole access across the shared bus to the shared NVRAM by only one of the multiple digital power controller devices at any given time.

21. The method of claim 17, further comprising providing shared access for the multiple digital power controller devices to the shared NVRAM by using the PWM master arbiter signal to sequentially broadcast to all of the multiple digital power controller devices the duty cycle-encoded addresses of each of the multiple digital power controller devices in round robin fashion.

22. The method of claim 17, where the shared NVRAM comprises a single shared NVRAM device.

23. The method of claim 17, further comprising providing each of the digital power controller devices with read-only access to any portion of the shared NVRAM.

24. The method of claim 17, further comprising using a different processing device from all of the digital power controller devices to provide arbitration between the multiple digital power controller devices for access to the shared NVRAM.

25. The method of claim 24, further comprising using a a complex programmable logic device (CPLD) to provide arbitration between the multiple digital power controller devices for access to the shared NVRAM.

26. A digital power subsystem, comprising:
    multiple digital power controller devices, each of the multiple digital power controller devices being configured to be coupled to control multiple digitally controlled voltage regulation components of an information handling system to separately control the power provided to individual power-consuming circuitry components or systems of the information handling system, or to a subgroup of the individual power-consuming circuitry components or systems; and
    shared non-volatile memory (NVRAM), each of the multiple digital power controller devices being coupled to access the shared NVRAM;
    the multiple digital power controller devices and the shared non-volatile memory (NVRAM) being configured to be coupled to one or more processing devices of the information handling system to form a communication topology configured to provide shared access for the multiple digital power controller devices to the shared NVRAM;
    where each of the multiple digital power controller devices has an assigned address; where the communication topology is configured to provide shared access for the multiple digital power controller devices to the shared NVRAM by:
        using a PWM master arbiter signal to broadcast to all of the multiple digital power controller devices a duty cycle-encoded address of a selected first one of the multiple digital power controller devices that is to be given sole access to the shared NVRAM during a current time period, and
        subsequently using the PWM master arbiter signal to broadcast to all of the multiple digital power controller devices a duty cycle-encoded address of a selected second one of the multiple digital power controller devices that is to be given sole access to the shared NVRAM during a new current time period, the selected second one of the multiple digital power controller devices being different than the selected first one of the multiple digital power controller devices, and
    where each given one of the multiple digital power controller devices is configured to decode the duty cycle address from the PWM signal and to access the shared NVRAM when the decoded address matches the assigned address of the given one of the multiple digital power controller devices.

27. The information handling system of claim 26, where the communication topology is configured to provide arbitration between the multiple digital power controller devices for access to the shared NVRAM.

* * * * *